United States Patent

Bray et al.

[15] 3,679,873

[45] July 25, 1972

[54] STABILIZING CIRCUIT FOR ANTICIPATING CONTROLLER

[72] Inventors: John R. Bray, Pensacola; Perry F. McKinney, Santa Rosa, both of Fla.

[73] Assignee: Monsanto Company, St. Louis, Mo.

[22] Filed: Jan. 11, 1971

[21] Appl. No.: 105,176

[52] U.S. Cl. ....................219/501, 219/494

[51] Int. Cl. ....................H05b 1/02

[58] Field of Search ....................218/499, 501, 494; 318/621

[56] References Cited

UNITED STATES PATENTS

| | | | |
|---|---|---|---|
| 3,240,916 | 3/1966 | Bray et al | 219/501 |
| 2,448,564 | 9/1948 | Wilkerson | 318/621 X |
| 2,439,198 | 4/1948 | Bedford | 318/621 |
| 2,251,973 | 8/1941 | Beale et al. | 318/621 X |

*Primary Examiner*—Bernard A. Gilheany
*Assistant Examiner*—F. E. Bell
*Attorney*—Stanley M. Tarter, Kelly O. Corley, Neal E. Willis and Elmer J. Fischer

[57] ABSTRACT

An SCR is supplied with quick-acting positive feedback bias to insure reliable turn-on. A slower acting negative feedback bias then turns the SCR off. The positive feedback bias makes the circuit less sensitive to variations among SCR's and other circuit components.

2 Claims, 1 Drawing Figure

PATENTED JUL 25 1972
3,679,873
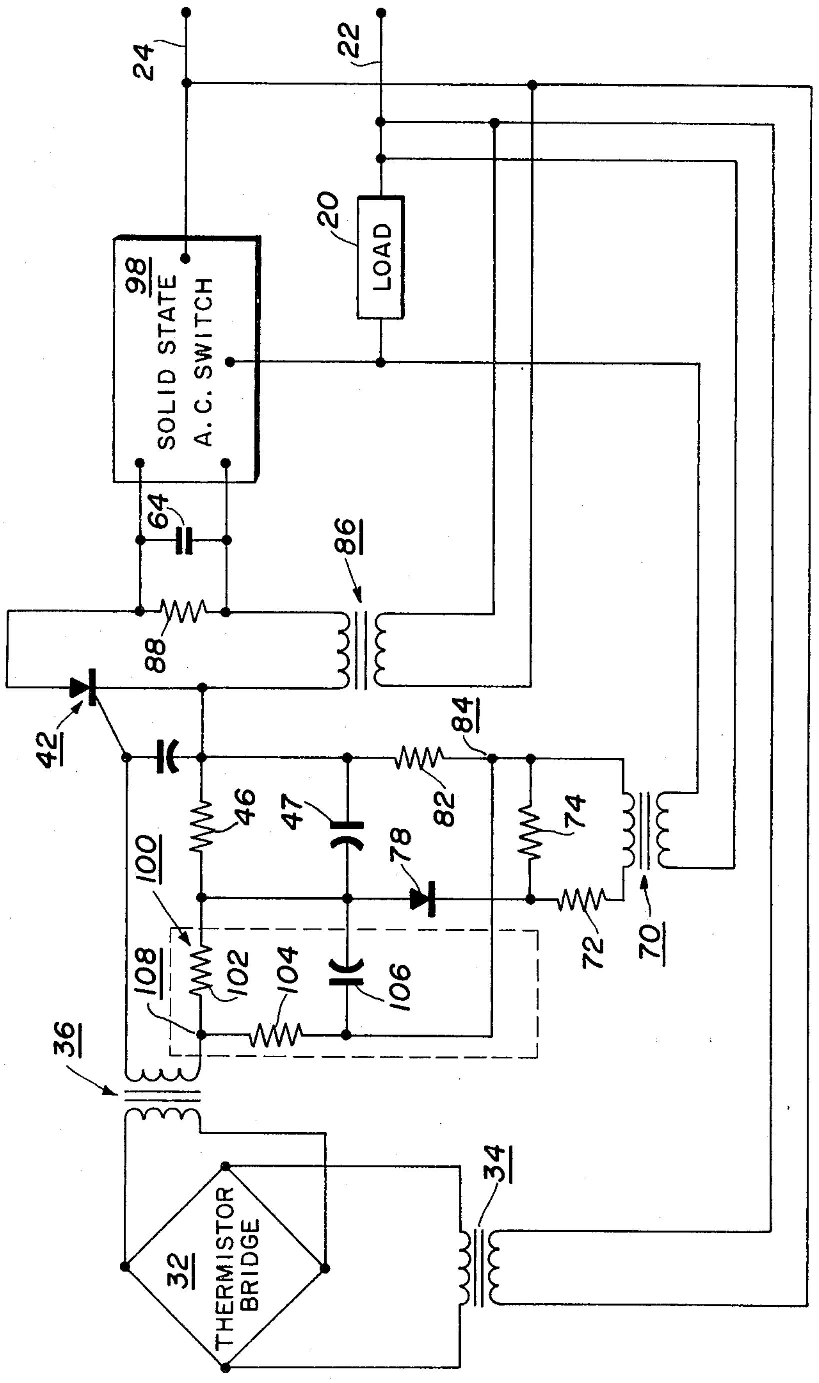
INVENTORS
J. R. BRAY
P. F. McKINNEY
BY
Kelly O. Corley
ATTORNEY

STABILIZING CIRCUIT FOR ANTICIPATING CONTROLLER

The invention relates to circuitry for controlling conduction in a solid state switching device, such as an SCR (silicon controlled rectifier).

This invention is an improvement over the circuitry disclosed in U.S. Pat. No. 3,240,916 to Bray et al, the disclosure of which is incorporated herein by reference. The noted Bray et al patent discloses a temperature controller wherein operation of an SCR is modified by a relatively slowly acting negative feedback bias. It has been found that the circuit disclosed in the noted Bray et al patent is sensitive to variations in the circuit components, and that the SCR must be carefully chosen if reliable operation is to be achieved. According to the invention, a relatively fast acting positive feedback is added, insuring positive firing of the SCR, and rendering the circuit much less sensitive to variations in the circuit components.

Accordingly, a primary object of the invention is to provide improved circuitry for controlling conduction in a solid state switching device, such as an SCR.

A further object is to provide circuitry of the above character wherein the circuit is relatively insensitive to variations in properties of the switching device.

Other objects will in part appear hereinafter and will in part be obvious from the following disclosure taken in connection with the accompanying drawing, wherein the single FIGURE is a schematic circuit diagram of the preferred embodiment of the invention.

The FIGURE is a modification of FIG. 2 in the above noted Bray et al patent, differing therefrom only in the three added components within box 100. For convenience, corresponding parts in the Bray et al patent and in the FIGURE are given the same reference characters, except that elements 26, 28, 60 and 62 in the Bray et al patent are schematically indicated in the FIGURE as box 98, and that the elements of bridge 32 are not shown.

The Bray et al circuit is modified by adding the positive feedback bias circuit 100. In the illustrated preferred embodiment, circuit 100 includes resistors 102 and 104, and capacitor 106. Resistor 102 is connected in series in the input circuit of SCR 42. Resistor 104 connects terminal 108 to terminal 84, and capacitor 106 connects terminal 84 to the anode of diode 78.

The component values are chosen so that the bias voltage across resistor 102 increases more rapidly initially than the bias voltage across resistor 46, when transformer 70 is energized. The charging current for capacitor 47 must flow through diode 78 and resistors 72 and 82, while the charging current for capacitor 106 flows only through resistor 72 and diode 78. Advantageously, capacitor 106 has less capacitance than does capacitor 47 to further enhance the more rapid buildup of voltage across capacitor 106. A portion of the voltage across capacitor 106 is applied as a positive feedback biasing voltage to resistor 102 so that terminal 108 becomes rapidly positive with respect to the anode of diode 78. This is of the polarity to enhance conductivity in SCR 42.

In the illustrated embodiment, the entire voltage across capacitor 47 appears across resistor 46 as a negative feedback biasing voltage, so that the anode of diode 78 relatively slowly becomes negative with respect to the cathode of SCR 42. However, since the full voltage across capacitor 47 is applied, the final bias voltage across resistor 46 exceeds the final bias voltage across resistor 102. The resultant feedback bias voltage (the algebraic sum of the positive and negative feedback bias voltages) applied between terminal 108 and the cathode of SCR 42 thus at first enhances and then opposes conduction in SCR 42.

When the remainder of the circuit components have the values disclosed in Bray et al U.S. Pat. No. 3,240,916, the preferred values for the components added by the present invention are: resistor 102, 470 ohms; resistor 104, 22 kilohms; and capacitor 106, 5 microfarads.

In the resulting circuit, bridge 32 generates an A.C. error signal having a magnitude related to the difference between the actual and sensed load temperatures. This error signal is fed through transformer 36 to fire SCR 42. When SCR 42 fires, power is applied to load 22. This simultaneously energizes the feedback bias networks through transformer 70. Junction 108 at first becomes positive with respect to the cathode of SCR 42 because of the rapid positive bias signal developed across resistor 102, to insure positive turn-on of SCR 42. As the voltage builds up across capacitor 47, the voltage at junction 108 becomes negative, and the circuit then operates as described in the noted Bray et al patent.

The addition of network 100 makes the circuit markedly less sensitive to variations in the circuit parameters. In particular, the parameters of SCR 42 are much less critical for proper operation.

While the invention has been specifically disclosed in the context of Bray et al U.S. Pat. No. 3,240,916 FIG. 2, it is equally applicable to FIG. 1 therein, and to various other modifications which will occur to those skilled in the art.

We claim:

1. Circuitry comprising in combination:

a. an A.C. energized solid state switching device having input and output circuits;

b. means in said output circuit for energizing a load upon conduction by said switching device;

c. said input circuit comprising, serially connected:

1. a signal source;

2. a first negative feedback network producing when energized a first bias voltage tending to oppose conduction of said switching device, said first bias voltage increasing at a relatively slow nonlinear rate toward a given first limiting value;

3. a second positive feedback network producing when energized a second bias voltage tending to enhance conduction of said switching device, said second bias voltage increasing at a relatively fast nonlinear rate toward a limiting value less than said first given value, whereby the resultant feedback bias voltage first enhances and then opposes conduction of said switching device;

d. each of said first and second networks being energized during the period when said load is energized.

2. The circuitry defined in claim 1, wherein said signal source includes means for generating a signal related to the temperature of said load.

* * * * *